(12) United States Patent
Lee et al.

(10) Patent No.: US 11,170,535 B2
(45) Date of Patent: Nov. 9, 2021

(54) VIRTUAL REALITY INTERFACE METHOD AND APPARATUS FOR PROVIDING FUSION WITH REAL SPACE

(71) Applicant: DEEPIXEL INC, Seoul (KR)

(72) Inventors: Jehoon Lee, Seoul (KR); Honam Ahn, Seoul (KR); Wahseng Yap, Seoul (KR)

(73) Assignee: DEEPIXEL INC, Seoul (KR)

( * ) Notice: Subject to any disclaimer, the term of this patent is extended or adjusted under 35 U.S.C. 154(b) by 413 days.

(21) Appl. No.: 16/097,946

(22) PCT Filed: Apr. 27, 2018

(86) PCT No.: PCT/KR2018/004952
§ 371 (c)(1),
(2) Date: Oct. 31, 2018

(87) PCT Pub. No.: WO2019/208851
PCT Pub. Date: Oct. 31, 2019

(65) Prior Publication Data
US 2021/0166438 A1    Jun. 3, 2021

(51) Int. Cl.
*G06T 11/00*  (2006.01)
*G06T 7/12*   (2017.01)
*G06T 7/50*   (2017.01)
*G06T 7/70*   (2017.01)

(52) U.S. Cl.
CPC ............. *G06T 11/00* (2013.01); *G06T 7/12* (2017.01); *G06T 7/50* (2017.01); *G06T 7/70* (2017.01); *G06T 2207/20221* (2013.01)

(58) Field of Classification Search
CPC ... G96T 11/00; G06T 7/12; G06T 7/50; G06T 7/70
USPC .......................................................... 345/633
See application file for complete search history.

(56) References Cited

U.S. PATENT DOCUMENTS

| 2017/0337444 A1* | 11/2017 | Novak   | G06F 3/011  |
| 2018/0108325 A1* | 4/2018  | Schwarz | G06T 11/60  |
| 2019/0130166 A1* | 5/2019  | Wang    | G06T 5/005  |

FOREIGN PATENT DOCUMENTS

| KR | 10-2012-0082712 A | 7/2012 |
| KR | 10-2015-0071611 A | 6/2015 |
| KR | 10-2016-0000873 A | 1/2016 |
| KR |    10-1639065 B1  | 7/2016 |
| WO |    2018/071225 A1 | 4/2018 |

* cited by examiner

*Primary Examiner* — Hai Tao Sun
(74) *Attorney, Agent, or Firm* — Novick, Kim & Lee, PLLC; Sang Ho Lee; Hyun Woo Shin

(57) ABSTRACT

A virtual reality interface method for providing fusion with a real space according to the present disclosure includes the steps of: analyzing information on an object of the real space to be projected in a virtual space based on image information of the real space acquired from a camera; determining transparency information for the object of the real space based on the object information of the real space; and fusing an object image of the real space and a virtual space based on the transparency information.

20 Claims, 6 Drawing Sheets

VIRTUAL REALITY INTERFACE METHOD AND APPARATUS FOR PROVIDING FUSION WITH REAL SPACE

TECHNICAL FIELD

The present disclosure relates to a virtual reality interface method and an apparatus thereof, which provide fusion with a real space.

BACKGROUND ART

A head mount display (HMD) is used to experience virtual reality (VR). The HMD is an apparatus mounted on the head of a user to place an image display in front of the eyes of the user. Although the HMD has an advantage of increasing indulgence by completely blocking the user's view, it invites some inconvenient situations.

For example, there are users who momentarily feel awkwardness and fear on wearing an HMD. This is since that a human visual system needs time for recognizing and being adapted to a virtual space when an existing real space is instantaneously blocked and a virtual space begins, and this a natural consequence considering that about 70% of the sense of perception of a human being rely on visual information.

In addition, when a user wears an HMD and attempts to hold an external input device (e.g., a controller or the like), the user feels uncomfortable because he or she cannot see. When the user takes off the HMD, he or she will experience similar discomfort. To solve this problem, a third party other than the user may help the user in the process of wearing and removing the HMD, or the user should measure the location of the external input device and get used to this process through repeated learning.

In addition, from the viewpoint of an interface, the virtual reality HMD currently does not have a function of displaying information on the real space. Accordingly, the virtual reality does not have an advantage of data augmentation through fusion with the real space, which can be obtained in an augmented reality (AR) environment.

DISCLOSURE OF INVENTION

Technical Problem

The present disclosure provides a virtual reality interface apparatus and a method thereof, which can recognize at least a part f image information of a real space acquired through a camera, mix the image information with information on a virtual space, and display the mixed information on a virtual reality apparatus.

The present disclosure provides a virtual reality interface apparatus and a method thereof, which can interact by extracting all or a specific object from an image of a real space acquired through a camera, determining transparency information based on information on the extracted object of the real space, and projecting the real space in virtual reality.

Technical Solution

A virtual reality interface method for providing fusion with a real space according to embodiments of the present disclosure comprises the steps of: analyzing object information of the real space from image information of the real space; determining transparency information for an object of the real space according to the object information of the real space; and fusing an object image of the real space by projecting the object of the real space in a virtual space based on the transparency information.

In an embodiment, the step of analyzing object information of the real space may include the steps of: extracting the object of the real space from the image information of the real space; and deriving parameter information for determining the transparency information of the extracted object of the real space, and analyzing the object information of the real space.

In an embodiment, the step of extracting the object of the real space may include the step of extracting at least one of a control object for controlling virtual reality, a background object of the real space, and a specific object of the real space, and the step of analyzing the object information of the real space by deriving parameter information may include the step of deriving at least one parameter of a parameter including adaptability information, a parameter including variance information, and a parameter including state information.

In an embodiment, the step of determining transparency information for an object of the real space may include the step of determining a transparency level for projecting the object of the real space in the virtual space based on the parameter information.

In an embodiment, the step of determining a transparency level for the object of the real space may include the step of recalculating the transparency level according to a variation of the transparency level when the parameter information meets a predetermined condition of changing the transparency level.

In an embodiment, the step of determining transparency information for an object of the real space may include the step of determining a transparent region for projecting the object of the real space in the virtual space based on the parameter information.

In an embodiment, the step of determining a transparent region for projecting the object of the real space may include the step of determining a shape and a transparency style of the transparent region and processing a boundary of the transparent region.

In an embodiment, when the control object is extracted from the image information of the real space, the parameter including adaptability information of the control object may be derived, and the step of determining transparency information for an object of the real space may include the step of adjusting the transparency level according to a degree of adaptability.

In an embodiment, when the background object is extracted from the image information of the real space, the parameter including variance information of the background object may be derived, and the step of determining transparency information for an object of the real space may include the step of adjusting the transparency level by sensing an environmental change in the real space based on the variance.

In an embodiment, when the specific object is extracted from the image information of the real space, the parameter including state information of the specific object may be derived, and the step of determining transparency information for an object of the real space may include the step of adjusting the transparency level based on the state information to have the specific object interact in association with the virtual space.

In an embodiment, the step of determining transparency information for an object of the real space may include the step of determining whether or not to reflect the transparent region as an entire region or a partial region of the virtual space based on at least one of the adaptability information, the variance information, and the state information included in the parameter information.

In an embodiment, the step of fusing object images of the virtual space and the real space based on the transparency information may include the step of adjusting positions of the object images of the virtual space and the real space with respect to an eyeline of a user wearing a virtual reality apparatus.

In an embodiment, a guide image for interfacing may be displayed above the fused image, wherein the guide image may not be displayed on the virtual reality apparatus if it is assumed that the positions of the object images in the virtual space and the real space match each other according to a predetermined time or a predetermined condition.

A virtual reality interface apparatus for providing fusion with a real space according to embodiments of the present disclosure comprises: an image analysis unit, a transparency information determination unit, and a transparency information reflection unit. The image analysis unit analyzes information on an object of a real space to be projected in a virtual space based on image information of the real space acquired from the camera. The transparency information determination unit determines transparency information for an object of the real space according to the object information of the real space. The transparency information reflection unit fuses object images of the virtual space and the real space based on the transparency information.

In an embodiment, the image analysis unit may extract the object of the real space from the image information of the real space, derive parameter information for determining the transparency information of the extracted object of the real space, and analyze the object information of the real space.

In an embodiment, the image analysis unit may extract at least one of a control object for controlling virtual reality, a background object of the real space, and a specific object of the real space, and derive at least one parameter of a parameter including adaptability information, a parameter including variance information, and a parameter including state information.

In an embodiment, the transparency information determination unit may determine a transparency level corresponding to a degree of transparency of the object of the real space to be projected in the virtual space based on the parameter information.

In an embodiment, the transparency information determination unit may recalculate the transparency level according to a variation of the transparency level when the parameter information meets a predetermined condition of changing the transparency level.

In an embodiment, the transparency information determination unit may determine a transparent region for projecting the object of the real space in the virtual space based on the parameter information.

In an embodiment, the transparency information determination unit may determine a shape and a transparency style of the transparent region and processes a boundary of the transparent region.

In the present disclosure, a computer-readable recording medium recording a program executing at least one of the methods described above and programs recorded in the computer-readable recording medium to execute at least one of the methods described above also fall within the scope of the present invention.

Advantageous Effects

According to the present disclosure, incapability of being adapted to virtual reality caused by the difference between a real space and a virtual space can be reduced. For example, the inconvenience of being unable to see when wearing or taking off an HMD can be solved. A user may hold or release an external input device while the user can see as usual and may have enough time to prepare before getting into a virtual environment. In addition, when the user feels dizziness or physical discomfort while experiencing the virtual reality, a sense of stability may be given by showing a real space.

According to the present disclosure, a user interface is extended, and convenience is enhanced. For example, when a virtual environment is controlled through hand motions, the present disclosure enhances accuracy of the hand motions and control operations according thereto by allowing the user to see his or her hand motions through a virtual space.

According to the present disclosure, a user is allowed to interact in connection with corresponding information by recognizing a specific object of a real space and projecting appropriate information in a virtual space. For example, it is possible to show a real space to give a warning when a dangerous situation (fire, power outage, etc.) is sensed in the surrounding environment, to recognize and show a face of a third party on a screen when the third party appears in front of the user experiencing virtual reality, or to have the user experience augmentation of a virtual space through interaction with a specific object placed in the real space.

BEST MODE FOR CARRYING OUT THE INVENTION

Figure 1:
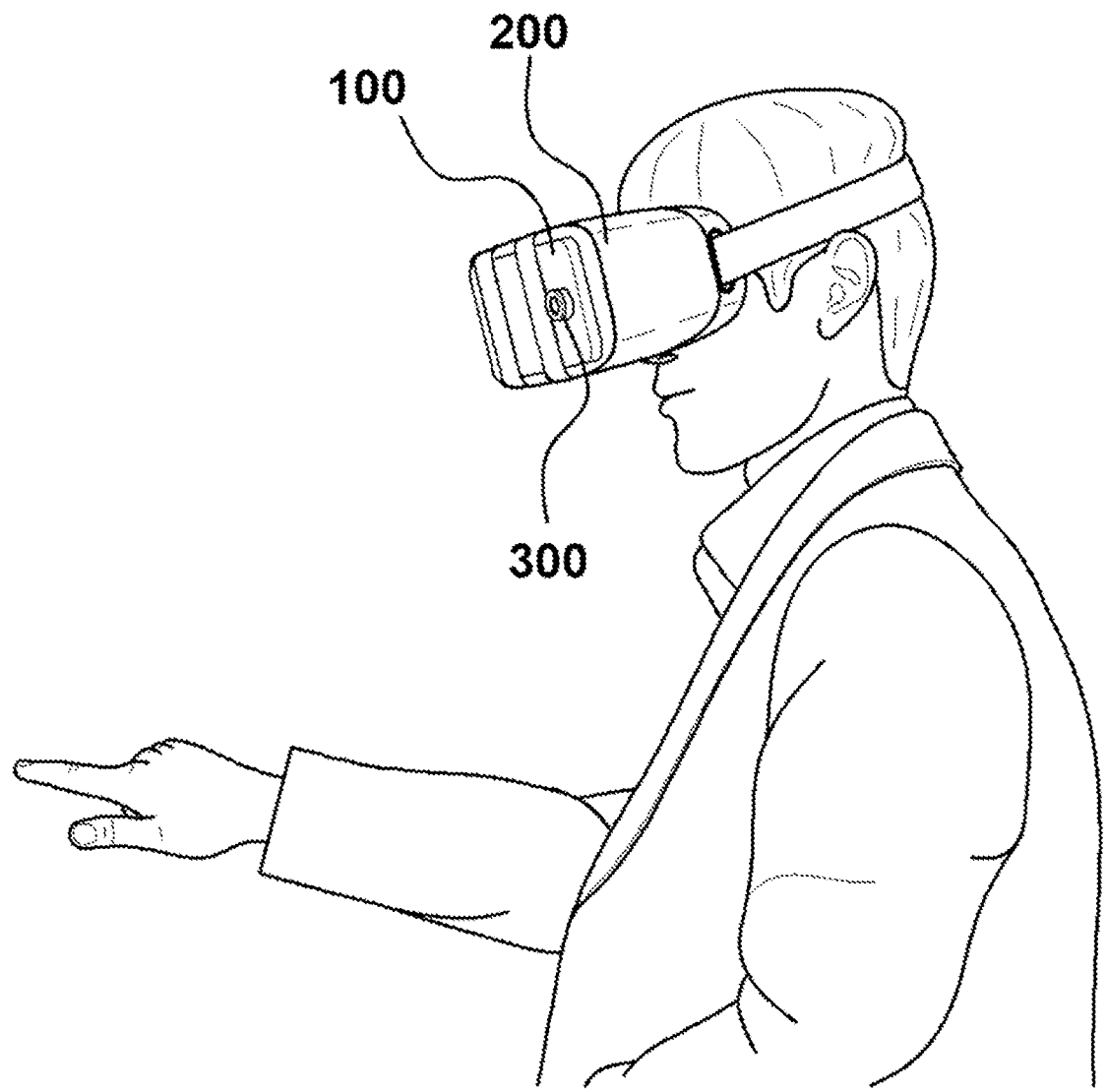
FIG. 1 is a view showing an example capable of applying a virtual reality interface apparatus for providing fusion with a real space according to an embodiment of the present disclosure.

Hereinafter, preferred embodiments of the present invention will be described in detail with reference to the accompanying drawings to clarify the spirit of the present invention. In describing the present invention, if it is determined that specific description of already known functions or constitutional components related to the present invention may make the gist of the present invention unclear, detailed description thereof will be omitted. Whenever possible, the same reference numerals and symbols are assigned to the constitutional components practically having the same functional configuration in the drawings although they are shown in different drawings. For the convenience of explanation, apparatuses and methods are described together in case of necessity.

FIG. 1 is a view showing an example capable of applying a virtual reality interface apparatus for providing fusion with a real space according to an embodiment of the present disclosure.

Referring to FIG. 1, a virtual reality interface apparatus for providing fusion with a real space according to an embodiment of the present disclosure (hereinafter, referred to as a "virtual reality interface apparatus") may include a virtual reality apparatus 100, a fixing device 200 configured to fix the virtual reality apparatus 100 so that it can be mounted on a user, and a camera 300.

The camera 300 may be mounted on the virtual reality apparatus 100 to substitute for the eyeline of the user. Accordingly, the camera 300 may be arranged in the direction that the user sees, and a display (not shown) is provided on the rear side of the virtual reality apparatus 100 on which the camera 300 is arranged and may display virtual reality to the user. For example, the fixing device 200 on which the virtual reality apparatus 100 is mounted is also referred to as a head mount display (HMD) all together. For example, the fixing device 200 may include a virtual reality (VR) goggle, a VR headgear and the like.

Although it is shown in FIG. 1 that the camera 300 is mounted on the virtual reality apparatus 100, this is only an example, and the camera 300 may be implemented to be mounted on the fixing device 200 or implemented independently. For example, when virtual reality is provided using a terminal device such as a smart phone, a camera mounted on the terminal device may be used, and in the case of an HMD without a camera mounted thereon, a camera separately installed outside the HMD may be used.

In addition, although it is shown in FIG. 1 and described that the virtual interface apparatus includes the virtual reality apparatus 100, the fixing device 200 and the camera 300, alternatively, the virtual reality interface apparatus according to an embodiment of the present disclosure may be configured to be independently implemented and included in a virtual reality apparatus such as an HMD.

Figure 2:
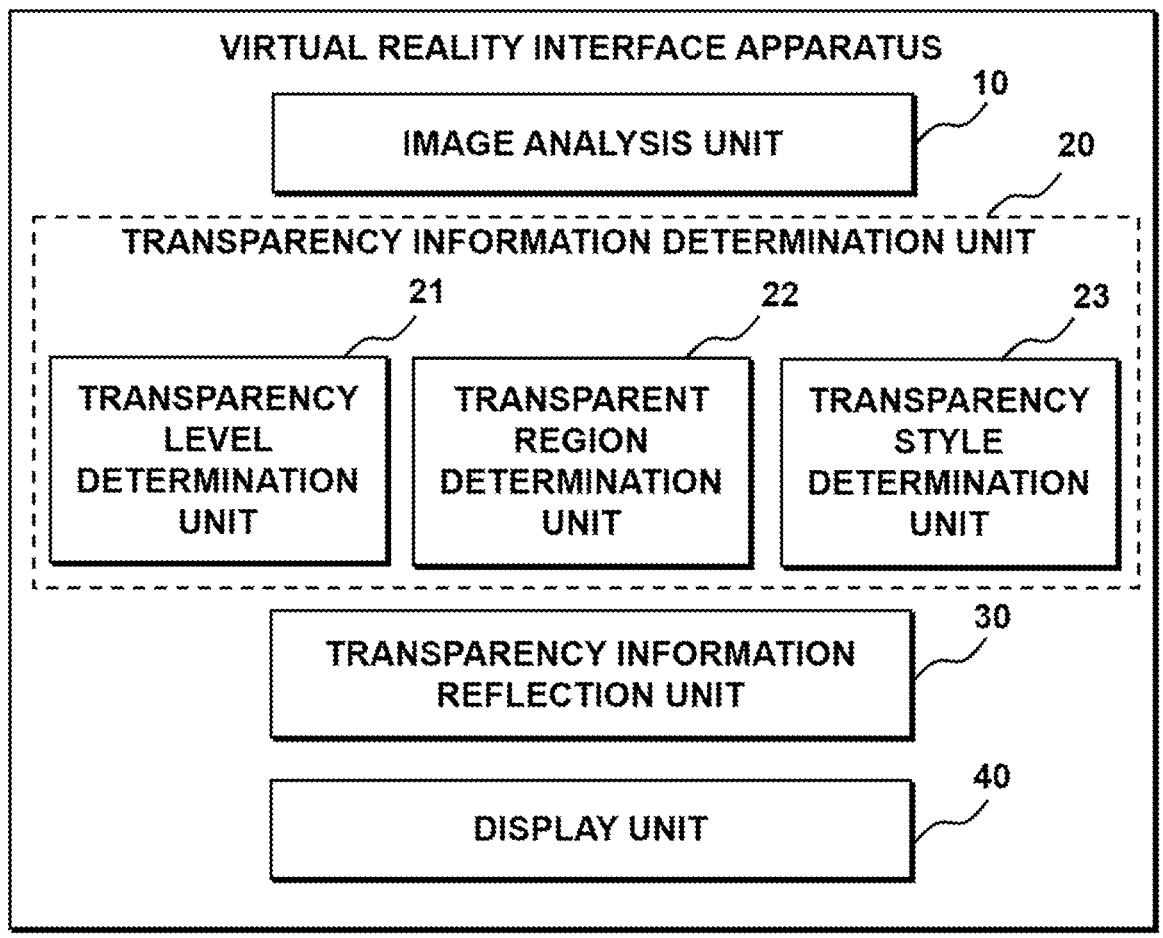
FIG. 2 is a block diagram briefly illustrating the configuration of a virtual reality interface apparatus according to an embodiment of the present disclosure.

FIG. 2 is a block diagram briefly showing the configuration of a virtual reality interface apparatus according to an embodiment of the present disclosure.

Referring to FIG. 2, a virtual reality interface apparatus according to an embodiment of the present disclosure may include an image analysis unit 10, a transparency information determination unit 20, a transparency information reflection unit 30, and a display unit 40.

The image analysis unit 10 may analyze information on an object of a real space to be projected in a virtual space based on image information of the real space acquired from the camera. According to embodiments, the image analysis unit 10 may extract an object of the real space from the image information of the real space, derive parameter information for determining transparency information for the extracted object of the real space, and analyze the object information of the real space.

The object information of the real space may include the object extracted from the image information of the real space and various parameter information according to features of the extracted object.

In an embodiment, the object of the real space refers to at least one object included in the image information of the real space and may include a control object for controlling virtual reality, a background object of the real space, and a specific object of the real space. For example, the control object is a configuration needed for controlling the virtual space by the user experiencing the virtual reality and may be a part of body such as a user's hand, a control device such as a controller, or the like. For example, the background object is information corresponding to a space analyzed as a background in the image information of the real space and may include a background image. For example, the specific object may be a specific object, a specific symbol, a face of a third party or the like included in the image information of the real space. In an embodiment, the specific object may be set or specified by the user from the outside at the moment of using the object.

The parameter information is information that becomes a basis for determining whether or not to project the object of the real space in the virtual reality and a degree of transparency. According to embodiments, the image analysis unit 10 may analyze various parameter information based on an object type.

In an embodiment, the parameter information may include adaptability information, variance information, and state information. For example, the image analysis unit 10 may analyze an object of the real space using an adaptability parameter corresponding to adaptability of a user to a virtual reality environment, a variance parameter corresponding to information related to environmental changes in the real space, and the state parameter corresponding to information related to a state of a virtual reality application or a state of a specific object of the real space. According to embodiments, although the parameter information may be determined differently according to object information, it can be determined to be independent from the object information of the real space. Accordingly, although the parameter information may be acquired by analyzing an image by the image analysis unit 10, it can be acquired based on other features of the virtual reality interface apparatus.

The adaptability parameter may correspond to a parameter reflecting a degree of experience and familiarity of the user experiencing the virtual reality. The number of times the user experiences the virtual reality, the time spent for the experience, and data on the frequency of the experience can be accumulated and analyzed through activation of the virtual reality interface apparatus and whether or not to execute (→ execution of) the virtual reality application driven in the apparatus. The image analysis unit 10 may estimate the adaptability parameter through the analysis, and the user himself or herself may input a degree of his or her experience on the virtual reality through the interface.

The variance parameter maybe set by the image analysis unit 10 by analyzing initial image information of the real space, which is inputted from the camera at the time point when the user wears the HMD included in the virtual reality interface apparatus to experience virtual reality, and a variance of the image information of the real space continuously inputted over time. The image analysis unit 10 may measure a variation and a variance of the image information by continuously analyzing changes of brightness, saturation, and contrast of the entire image or a specific region.

The state parameter may be diversely set according to the object and features of the virtual reality application driven in the virtual reality interface apparatus. For example, when an application which interacts while tracking a specific object in a real space is executed, the state parameter may be information on the position and the size of the object, and the image analysis unit 10 estimates the position and size of the object through an image recognition and tracking algorithm. As another example, when an application which uses information on the face of a third party staying in the real space is driven in the virtual reality interface apparatus, the position and direction of the face and information on the facial expression may be the state parameter, and the image analysis unit 10 may estimate the state parameter through a face recognition and facial expression analysis algorithm.

The transparency information determination unit 20 may determine transparency information of virtual reality for projecting an object of the real space based on the object information of the real space. The transparency information may include transparency level information, transparent region information, and a transparency style. For virtual reality which provides a feeling of perfect immersion to the user, the user's entire view should be filled with virtual reality. However, the virtual reality interface method and apparatus according to the present disclosure displays an object of the real space to be projected through the virtual reality by processing some regions of the virtual reality to be transparent in order to give a proper feedback to the user. In another embodiment, it may be processed to display a corresponding object visually above the virtual reality while adjusting the transparency level of the object image of the real space.

In an embodiment, the transparency information determination unit 20 may include a transparency level determination unit 21, a transparent region determination unit 22, and a transparency style determination unit 23.

The transparency level determination unit 21 may determine a transparency level of a virtual reality image which implements a virtual space based on parameter inf of an object of the real space so that the object of the real space may be projected in the virtual space. It may be understood that the higher the transparency level is, the more clearly the object of the real space may be projected, and the lower the transparency level is, the more the object of the real space is hidden and a degree of displaying the virtual reality image increases.

The transparent region determination unit 22 may determine a region of the object of the real space to be projected in the virtual reality based on the parameter information of the object of the real space. Since an image constructing the virtual reality should be transparent to project the object of the real space in the virtual reality, the transparent region of the virtual reality may correspond to the size and shape of the object of the real space.

According to embodiments, the transparent region determination unit 22 may determine whether or not to process the entire region of the virtual space to be transparent or to set a transparent region to correspond to the size of the recognized object of the real space based on at least one of the adaptability information, the variance information, and the state information included in the parameter information of the object of the real space.

The transparency style determination unit 23 may process the boundary of the transparent region by determining a shape and a style of the transparent region, based on the transparency level or the transparent region of the object of the real space.

The transparency information reflection unit 30 displays the object of the real space and the virtual reality image together based on the transparency information. According to embodiments, the transparency information reflection unit 30 may render an object image of the real space created based on the transparency information and display the object image on the virtual reality apparatus, based on the virtual space.

According to embodiments, rendering the virtual space and the real space may be accomplished according to the process of rendering at least part of the virtual reality image and the object image of the real space. According to embodiments, the transparency information reflection unit 30 may render two pieces of information by performing coordinate conversion between the virtual reality image and the object image of the real space acquired through the camera, to reduce the sense of inconsistency between the virtual reality image and the object of the real space.

The coordinate conversion may be accomplished based on the features of the physical device of the virtual reality interface and the features of the user of the virtual reality interface apparatus. The coordinate conversion between the real space and the virtual space will be described in detail with reference to FIG. 5.

The display unit 40 may display a guide image for matching the position of the object image of the real space to the virtual space with respect to the eyeline of the user wearing the virtual reality apparatus. At this point, the display unit 40 may display the guide image on the virtual reality apparatus during a predetermined time period or may not display the guide image on the virtual reality apparatus if it is assumed that the position of the object image of the real space matches the virtual space according to a predetermined condition.

Figure 6:
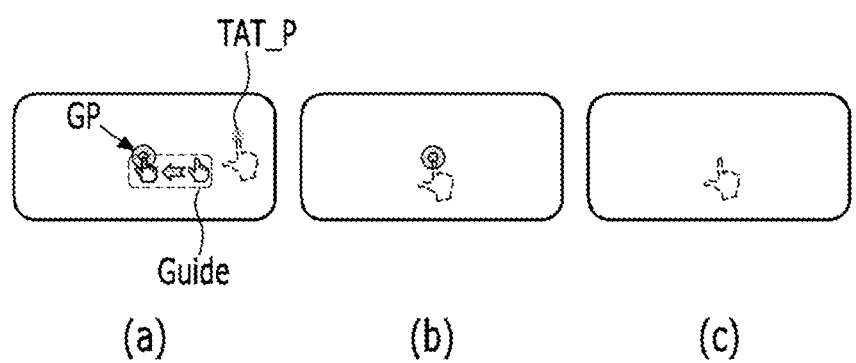
FIG. 6 is a view conceptually showing a virtual space displayed through a virtual reality interface apparatus.

FIG. 6 is a view conceptually showing a virtual space displayed through a virtual reality interface apparatus. FIG. 6 illustrates a case in which the object image of the real space is a fingertip TAT_P of the user. A guide for matching the object image of the real space, i.e., the fingertip, to the focal point GP of the eyeline in the virtual space may be displayed in FIG. 6(*a*). This guide may also include a circular mark of the center point indicating the focal point of the eyeline. When the user matches the object image of the real space to the focal point GP of the eyeline in the virtual space as shown in this guide image of FIG. 6(*b*), the guide image may be removed as shown in FIG. 6(*c*), and in addition, the object image of the real space may also be removed to display only a complete virtual space to the user.

According to embodiments, when the position of the object image of the real space matches the virtual space, an interface command may be executed for ser to match the position of the object image of the real space to a specific center point in the virtual space, e.g., the center of the virtual space where the eyeline of the user stays. Accordingly, the user may move the object image of the real space or his or her eyeline to match the object image of the real space and the focal point of the eyeline of the user. At this point, the current position of the focal point of the eyeline can be displayed through the guide image, and the user may act to match the positions of the object image of the real space to the position where the guide image is displayed. When the specific position of the virtual space snatches the position of the object image of the real space, it is determined that the user recognizes the relation between the position of the virtual space and the position of the real space, and the guide image can be removed.

Figure 3:
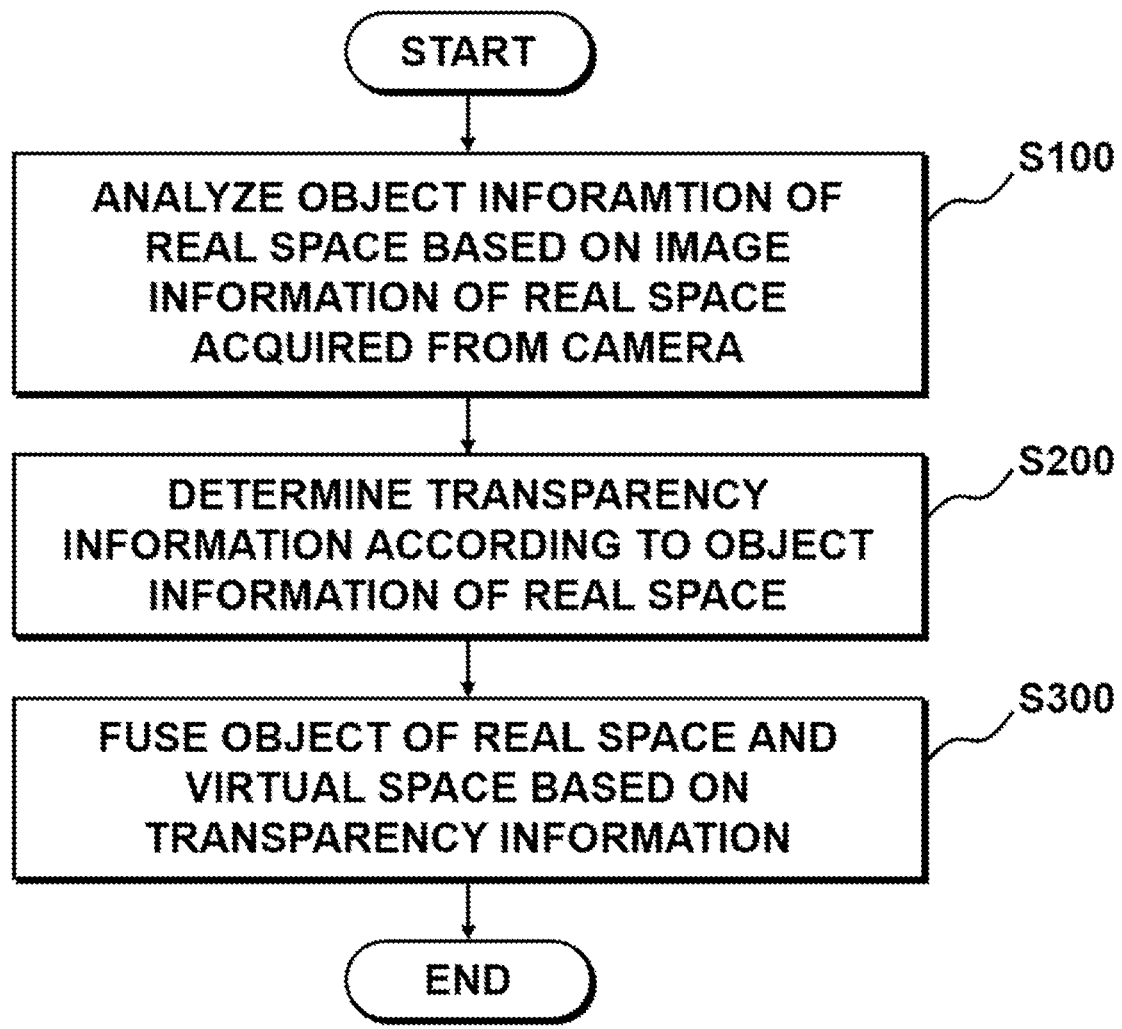
FIG. 3 is a flowchart briefly illustrating a virtual reality interface method for providing fusion with a real space according to an embodiment of the present disclosure.

FIG. 3 is a flowchart briefly illustrating a virtual reality interface method for providing fusion with a real space according to an embodiment of the present disclosure. The method of FIG. 3 may be performed by the virtual reality interface apparatus of FIGS. 1 and 2.

Referring to FIG. 3, a virtual reality interface method for providing fusion with real space according to an embodiment of the present disclosure (hereinafter, referred to as a virtual reality interface method) may include the steps of: analyzing information on object of the real space to be projected in a virtual space based on image information of the real space acquired from a camera (step S100), determining transparency information for the object of the real space based on the object information of the real space (step S200), and reflecting the object image of the real. space in the virtual space based on the transparency information (step S300). The operation of each step will be described in detail with reference to FIG. 4.

Figure 4:
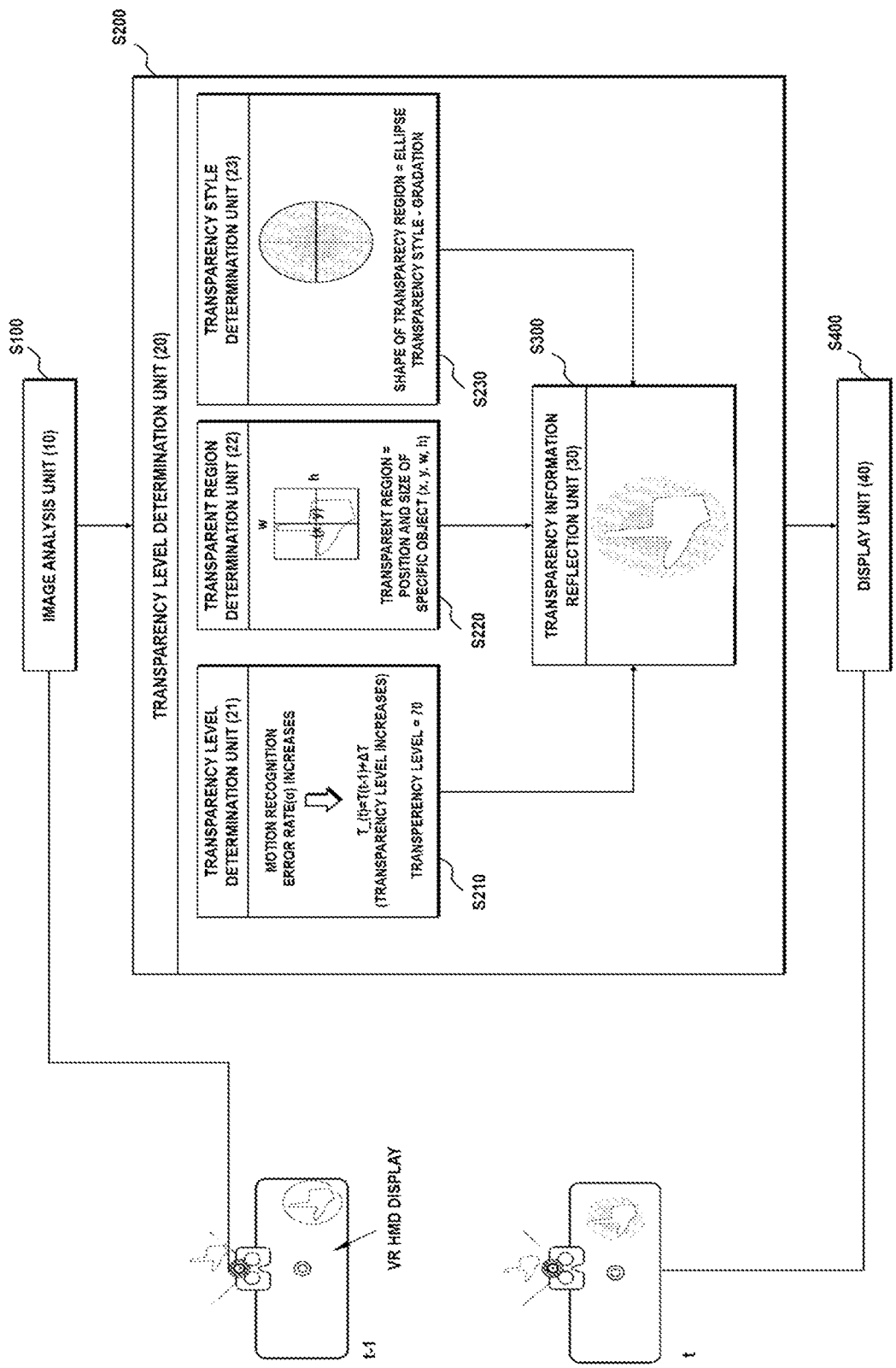
FIG. 4 is a diagram illustrating an example of applying a virtual reality interface method according to an embodiment of the present disclosure.

FIG. 4 is a view showing an example of applying a virtual reality interface method according to an embodiment of the present disclosure. The method of FIG. 4 may be performed by the virtual reality interface apparatus of FIGS. 1 and 2.

Referring to FIG. 4, the image analysis unit 10 may analyze object information of a real space to be projected in a virtual space based on image information of the real space acquired. from the camera (step S100). According to embodiments, the image analysis unit 10 may extract an object of the real space from the image information of the real space, derive parameter information for determining transparency information of the extracted object of the real space, and analyze the object information of the real space.

In an embodiment, in the case of a virtual reality application which interacts by controlling a specific object in a virtual reality space using a part of body such as a user's hand or a control device such as a controller, the image analysis unit 10 may extract a control object (e.g., a user's hand, a controller or the like) from the image information of the real space, and derive parameter information needed for projecting the extracted control object in the virtual space. For example, as shown in FIG. 4, when a user's hand is extracted as a control object, the image analysis unit 10 may derive a parameter including adaptability information (e.g., a parameter corresponding to a motion recognition error rate) according to a degree of recognizing hand motions or a degree and familiarity with the hand motions by estimating the position, the size and the like of the hand through analysis of the hand motions.

In another embodiment, the image analysis unit 10 may extract a background object from the image information of the real space, and derive a parameter for grasping environmental changes in the real space by analyzing brightness of the extracted background object image or change of the background image. For example, the image analysis unit 10 may extract a background object from image information of the real space acquired through a camera when the user wears a virtual reality apparatus such as an HMD and image information of each real space acquired through the camera after a predetermined time is elapsed, and derive a parameter including variance information corresponding to environmental changes in the real space from the difference in the image brightness or the background image between the two background objects.

In still another embodiment, the image analysis unit 10 may extract a specific object (e.g., a specific things, a specific symbol or the like) from the image information of the real space, and derive parameter information needed for projecting the extracted specific object in the virtual space. For example, the image analysis unit 10 may extract a specific object from the image information of the real space and derive a parameter including state information of the specific object by analyzing information on the position and the size of the extracted object, and at this point, when the specific object moves, the image analysis unit 10 may derive a parameter including information related to the moving path of the specific object by analyzing change of the image in the real space over time. Here, various object recognition and tracking algorithms included in an image processing algorithm may be used for recognition and tracking of objects in an image, and for example, a position and a size of an object can be estimated using an object tracking algorithm using a Kalman filter, a Bayesian algorithm or the like.

The transparency information determination unit 20 may determine transparency information of a virtual reality image for projecting an object of a real space according to object information of the real space (step S200). The transparency information according to the present disclosure is information for reflecting an object actually existing in the real space in the virtual space, which functions as a guide for a user to reduce the fear of virtual reality and to easily adapt to the virtual reality by adjusting the transparency information according to the adaptability and experience to the virtual environment. In addition, the transparency information may be adjusted not to hinder indulgence in the virtual reality after adapting to the virtual reality.

In an embodiment, the transparency level determination unit 21 may determine a transparency level corresponding to a degrees of transparently corresponding to a virtual reality image based on the parameter information of the object of the real space so that the object of the real space may be exposed (step S210). For example, initially, the transparency level $T\_(0)$ may be 0. At the time point of t, the transparency level $T\_(0)$ may be calculated based on the variation of the transparency level $\Delta T$ with respect to the transparency level $T\_(t-1)$ of the previous time point, and it may be calculated as shown in Equations 1 and 2 according to increase and decrease of the transparency level.

$$T\_(t)=T\_(t-1)+\Delta T \text{ (Transparency level increases)} \quad \text{[Equation 1]}$$

$$T\_(t)=T\_(t-1)-\Delta T \text{ (Transparency level decreases)} \quad \text{[Equation 2]}$$

Here, time t means a processing time. The range of transparency level T may be $0 \leq T \leq 100$. If T=0, only the virtual space is shown, and if T=100, only the real space inputted through the camera can be shown. $\Delta T$ is a parameter determining a width of increase or decrease of the transparency level, and although it can be set to 1 as default, it is only an example. The default may be defined as another value, and the user may set the width of increase or decrease by himself or herself.

According to embodiments, when the transparency level is 0, an operation of analyzing an image and extracting an object may not need to be performed. In addition, when the transparency level is 100, an image to be displayed in the virtual space may not need to be processed.

The transparency level may be manually set by the user or automatically set by the virtual reality interface apparatus. For example, when the transparency level is automatically set, the transparency level determination unit 21 may properly adjust the transparency level according to the parameter information of the object of the real space.

In an embodiment, in the case of a virtual reality application which interacts by controlling a specific object in a virtual reality space using a part of body such as a user's hand or a control device such as a controller, the transparency level determination unit 21 may determine the transparency level based on a parameter including adaptability information (e.g., a parameter corresponding to a motion recognition error rate) according to a degree of recognizing hand motions derived by the image analysis unit 10 or a degree and familiarity with the hand motions.

For example, when the parameter corresponding to the motion recognition error rate shows that the motion recognition error rate is high, the transparency information determination unit 20 may determine a transparency level to display a control object (e.g., a user's hand) in the virtual space. If the motion recognition error rate is shown to be low thereafter, it may be controlled not to show the control object (e.g., a user's hand) in the virtual space by lowering the transparency level.

In another embodiment, the transparency level determination unit 21 may determine the transparency level by sensing an environmental change based on a parameter including variance information derived by the image analysis unit 10 (e.g., a parameter for grasping environmental changes in the real space). For example, when an emergency situation such as a fire, a power outage or the like occurs in the real space while the user wears a virtual reality apparatus such as an HMD and experiences a virtual reality environment, the image analysis unit 10 may derive a parameter for grasping environmental changes in the real space by applying an image processing algorithm, such as a fire detection algorithm, an abnormal situation detection algorithm or the like, to the image information of the real space. In this case, the transparency level determination unit 21 may determine that an emergency situation occurs in the real space based on the parameter for grasping environmental changes in the real space and determines the transparent level (e.g., T=100) to display an object of the real space in the virtual space.

In still another embodiment, the transparency level determination unit 21 may determine the transparency level based on a parameter including state information of a specific object derived by the image analysis unit 10. For example, when a third party appears or a specific object is placed in the real space while the user wears a virtual reality apparatus such as an HMD and experiences a virtual reality environment, the image analysis unit 10 may extract the face of the third party or the specific object from the image information of the real space and derive a parameter including state information thereof, and the transparency level determination unit 21 may determine the transparency level based on the parameter including the state information to display the face of the third party or the specific object in the virtual space. In the embodiment of the present disclosure like this, an interface through which a user may interact between a real space and a virtual space can be provided by projecting a third party or a specific object that actually exists in the real space.

When the parameter information meets a predetermined condition for changing the transparency level, the transparency level determination unit 21 may recalculate the transparency level according to the variation of the transparency level ΔT as shown in Equation 1. For example, whether a predetermined time is elapsed, a threshold value set to the parameter, a value of change in the parameter over time or the like may be used as the transparency level change condition.

The transparent region determination unit 22 may determine a transparent region of an object of the real space to be projected in the virtual space based on the parameter information (step S220). According to embodiments, the transparent region determination unit 22 may determine whether or not to reflect the transparent region as the entire region or a partial region of the virtual space based on the adaptability information, the variance information, the state information or the like included in the parameter information.

As an embodiment, when a specific object of the real space is to be projected and displayed in the virtual space, the transparent region determination unit 22 may grasp the position (e.g., (x, y) coordinate information) and the size (e.g., (w, h) width and height information) of the specific object from the parameter corresponding to the state information of the specific object analyzed by the image analysis unit 10, and set a transparent region for projecting the specific object in the virtual space using the information on the specific object.

As another embodiment, if it is determined, from the parameter corresponding to a degree of environmental change in the real space analyzed by the image analysis unit 10, that an emergency situation occurs in the real space, the transparent region determination unit 22 may set a transparent region so that an object of the real space may be to projected and displayed in the entire region of the virtual space.

The transparency style determination unit 23 may process the boundary of a transparent region by determining a shape and a transparency style of the transparent region (step S230). The shape of a transparent region may be specified in a specific shape according to a virtual reality application, as well as in the shape of a basic figure such as a circle, an ellipse, a square, a rectangle or the like. According to embodiments, the shape of a transparent region may correspond to the shape of an object of the real space. The transparency style may be processed using, for example, a Gaussian mask, a Gradation mask, an equivalent type mask or the like.

In an embodiment, when the transparent region determination unit 22 determines a partial region of the virtual space as a transparent region in which an object of the real space is projected, the transparency style determination unit 23 smoothly processes the boundary between the transparent region and the regions other than the transparent region so that indulgence of the user in the virtual reality may not be hindered. In addition, the shape or the transparency style of the transparent region may be manually set by the user or automatically set by the virtual reality interface apparatus.

For example, if it is determined, from the parameter corresponding to a degree of environmental change in the real space analyzed by the image analysis unit 10, that an emergency situation occurs in the real space, the transparency style determination unit 23 may set the shape of a transparent region as a shape fully filling the entire region of the virtual space (e.g., the shape of the entire region displayed through the virtual reality apparatus). Alternatively, when it is desired to project and display a specific object of the real space in the virtual space, the transparency style determination unit 23 may determine a shape of the transparent region based on the shape of the specific object and specify a Gaussian mask or the like as a transparency style for the shape of the transparent region, The transparency information reflection unit 30 may fuse the virtual reality image and the object of the real space based on the transparency information (step S300). The transparency information reflection unit 30 may render the object image of the real space created based on the transparency information and display the object image on the virtual reality apparatus.

In an embodiment, the transparency information reflection unit 30 may fuse two images by applying the style determined by the transparency style determination unit 23 and applying the transparency level determined by the transparency level determination unit 21 to the virtual reality image of a part determined as a transparent region by the transparent region determination unit 22 so that the object of the real space may be projected under the transparent region. In this case, the virtual reality image may be placed visually above the real space image. This visual relation may be implemented as hierarchical layers are formed.

In another embodiment, the transparency information reflection unit 30 may fuse two images to place an image of the real space visually above a virtual reality image by reflecting all the information on the transparent region set by the transparent region determination unit 22, the transparency style determined by the transparency style determination unit 23, and the transparency level determined by the transparency level determination unit 21 based on information on the real space acquired from the camera and analyzed by the image analysis unit 10.

For example, when the transparency information determination unit 20 determines, from the parameter corresponding to a degree of environmental change in the real space analyzed by the image analysis unit 10, that an emergency situation occurs in the real space, the transparency information may be set such that "transparency level=100", "transparent region=all", and "transparency style=none", and accordingly, the transparency information reflection unit 30 may fuse a virtual reality image and a real space image by reflecting the transparency information so that the object of the real space may be projected in the virtual space. In this case, since the real space is displayed on the virtual reality apparatus as is, the user may recognize the real space even while experiencing the virtual reality and grasp that an emergency situation has occurred. Accordingly, in the present disclosure, since the user is guided to get out of the virtual space when an emergency situation such as a sudden power outage or a fire occurs, the user may safely experience the virtual reality.

As another example, in the present disclosure, the transparency information may be determined to help the user to be adapted to the virtual reality environment and safely hold a control device when the user wears an HMD first. If the transparency information determination unit 20 determines, from the parameter including the adaptability information analyzed by the image analysis unit 10 (e.g., the parameter corresponding to a motion recognition error rate), that adaptability of the user to the virtual reality environment is low, the transparency information may be set such that "transparency level=50 or higher", "transparent region=all", and "transparency style=none", and accordingly, the transparency information reflection unit 30 may reflect the transparency information and create an object image of the real space transparently projected through the virtual space. Accordingly, the user may easily find and use a control device such a controller placed in the real space. If the user is ready to experience virtual reality thereafter, the transparency level gradually decreases, and the transparency level is finally set to 0 so that the user may indulge in the virtual reality.

Figure 5:
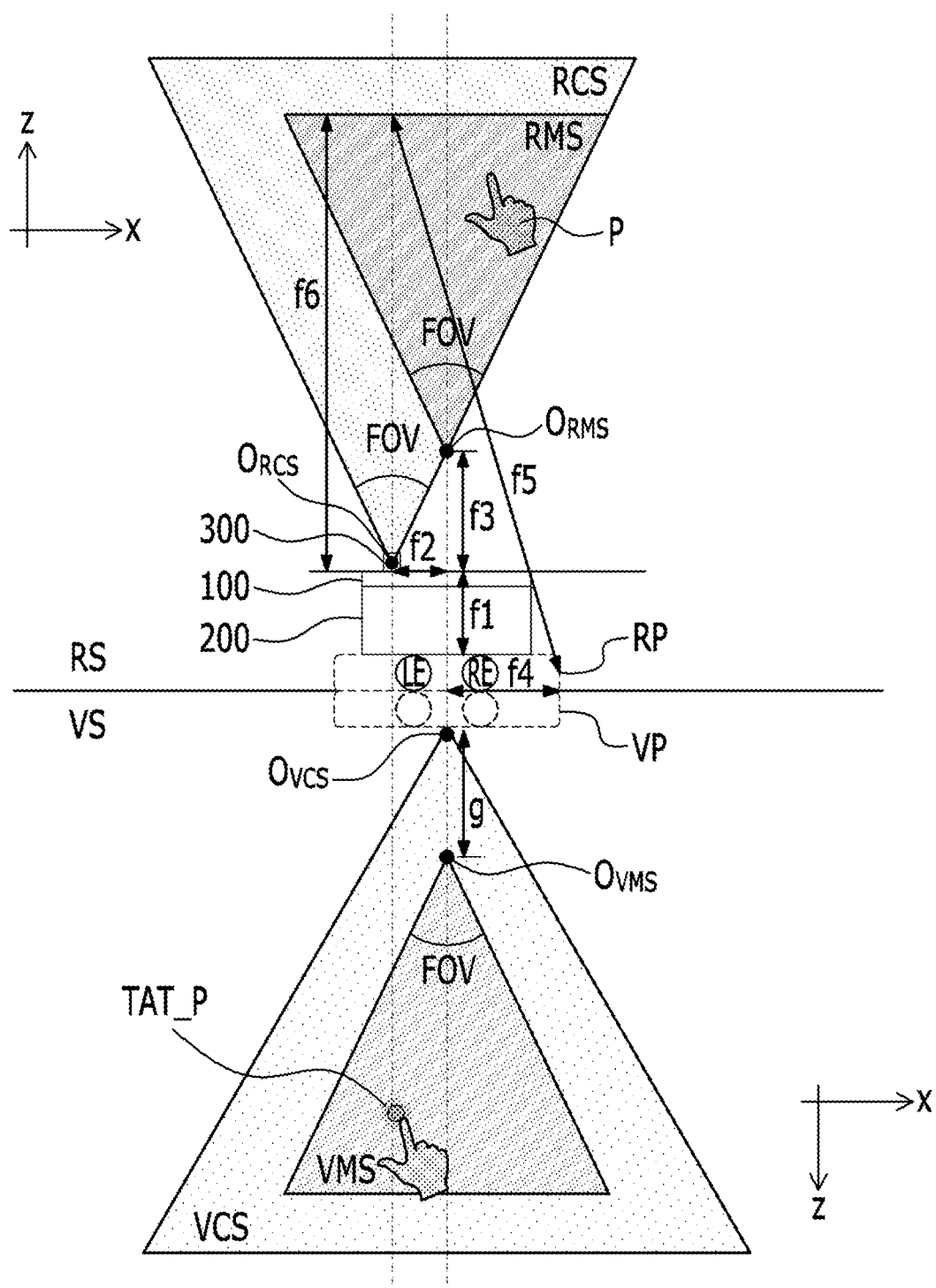
FIG. 5 is a diagram illustrating a method of converting coordinates by sorting two pieces of information to fuse a virtual space and a real space by a transparency information reflection unit according to an embodiment of the present disclosure.

FIG. 5 is a view illustrating a method of converting coordinates by sorting two pieces of information to fuse a virtual space and a real space by a transparency information reflection unit according to an embodiment of the present disclosure. In FIG. 5, conversion of a coordinate system is shown assuming that the portion above the virtual reality apparatus 100 is a real space (RS) and the portion under the virtual reality apparatus 100 is a virtual space (VS). Although it is described in FIG. 5 focusing on a case, in which an object of the real space is an image of a user's hand, i.e., a control object, the present disclosure is not limited thereto.

The real space RS may be defined by the relation among the eyeline LE and RE of a real player RP wearing the virtual reality interface apparatus, a virtual reality apparatus 100 included in the virtual reality interface apparatus, a single camera 300, and a fixing device 200.

Although it is described in this specification that the virtual reality interface apparatus is configured of the virtual reality apparatus 100, the single camera 300, and the fixing device 200 and shown in the drawings on the basis thereof, it is sufficient for the virtual reality interface apparatus according to an embodiment of the present disclosure to include at least one external imaging device and a means for displaying for a user to recognize virtual reality.

Since the virtual reality apparatus 100 is placed in front of the eyes of the real player RP in the real space RS, the user's view to the real space RS is blocked. An object of the present disclosure is to improve adaptability of the user to the virtual reality by extracting an object from an image of the real space RS acquired through the imaging device, such as the single camera 300 included in the virtual reality interface apparatus, and providing such information to the user transparently for a predetermined time period to control the virtual reality interface through the object. For example, when the object of the real space corresponds to a control object capable of performing an interface control in virtual reality like a hand of the real player, efficiency of the user's control can be improved if a feedback for providing the user with the control object transparently is provided.

The space acquired through the single camera 300 may be defined as a real camera space RCS according to the field of view $FOV_{cam}$ of the camera. The coordinates of the real camera space RCS may be obtained by performing an inverse projection matrix operation on the real space RS coordinates.

However, there is a difference between the coordinates of the real camera space RCS and the user's eyeline. In addition, a space in which the user actually uses an indicator which can perform a command like a user's hand, i.e., a control object, or a space other than this, in which an object of another real space is placed, can be defined differently. In the present disclosure, a space in which the user may move the control object which performs a command while matching to the eyeline of the user or a space in which an object of the real space moves is defined as a real motion space RMS. The real motion space RMS may be extended as far as the maximum depth (i.e., in z-axis direction) where an object of the real space including the user's hand or the control object is placed using a point where the center point of the eyelines LE and RE of the real player RP meets the real camera space RCS as the origin $O_{RMS}$.

The real motion space RMS may be defined based on the features of the virtual reality interface apparatus. According to embodiments, in the virtual reality interface apparatus, the center point of the eyelines LE and RE of the real player RP may correspond to the center point of the fixing device 200 of the virtual reality interface apparatus.

The field of view $FOV_{rs}$ of the real motion space RMS may have an angle the same as that of the field of view $FOV_{cam}$ of the camera.

The real motion space RMS may be defined based on a first factor f1 corresponding to the distance between the eyeline of the user wearing the virtual reality interface apparatus and the single camera 300 in the depth direction (z-axis direction), a second factor f2 corresponding to the distance between the center of the virtual reality apparatus 100 and the single camera 300 in a first direction (x-axis direction) practically perpendicular to the depth direction, and a third factor f3 corresponding to the distance between the real camera space RCS and the center of the virtual reality apparatus 100 in the depth direction considering the field of view $FOV_{cam}$ of the single camera 300. In this specification, since the first to third factors f1 to f3 are features determined based on the distance between the single camera 300 and the virtual reality apparatus 100 or the center of the eyeline of the user, they are described as being included in the distance factor.

In addition, according to the present disclosure, when an object of the real space is the body of a real player RP or an object which can move while being contacting with the body, the real motion space RMS may be converted to a virtual space based on user factors f4, f5 and f6 defined based physical features of the user's body, such as the height and the weight of the real player RP.

For example, when the control object is a user's hand, according to embodiments, user factors such as a fourth factor f4 corresponding to the shoulder width of the real player RP and a fifth factor f5 corresponding to the arm length may be acquired from a storage means or the image analysis unit 10 included in the virtual reality interface apparatus or from the outside of the virtual reality interface apparatus according to the physical features of the user, such as the height and the weight of the user. A sixth factor f6 may correspond to the distance in the depth direction from the single camera 300 to the depth of the real motion space RMS defined by the fifth factor f5.

In another embodiment, the user factors according to the physical features of the user may be acquired as the user inputs the user factors in the virtual reality interface apparatus, and the user factors are stored in the storage means or the image analysis unit 10.

The process of converting the real camera space RCS to the virtual motion space RMS may follow the process of moving the origin of the real camera space RCS in the x-axis direction and the z-axis direction according to the distance factor f2 between the center of the fixing device 200 and the single camera 300 and the distance f3 to the point where the center of the fixing device 200 meets the real camera space RCS, i.e., the origin $O_{RMS}$ of the real motion space RMS. That the maximum moving distance of the real camera space RCS in the z-axis direction is limited by the physical features of the real player RP does not affect the coordinate conversion of the real camera space RCS.

As the coordinates of the object of the real space interpreted from the image acquired from the single camera 300 are converted into a coordinate system which matches the object coordinates to the eyeline of the real player RP, the virtual reality interface apparatus may minimize the sense of inconsistency of the user in using an object (e.g., a hand) recognized as a control object.

The converted real motion space RMS needs to be converted to the virtual space VS. A virtual player VP corresponding to the real player RP is set in the virtual space VS, and the real motion space RMS is converted to the virtual motion space VMS. The process of converting the real motion space RMS to the virtual motion space VMS may follow a space ratio between the real space RS and the virtual space VS.

The space ratio between the real space RS and the virtual space VS may be determined based on a ratio of the maximum moving distance of the real player of the real space RS in the real motion space RMS, i.e., the maximum moving distance f5 included in the user factors according to the physical features of the user, and a scale parameter of the virtual space VS. The scale parameter of the virtual space VS may be a predetermined value which may vary according to setting of a designer who designs the virtual space VS.

Accordingly, except the space ratio, the virtual motion space VMS may be a space in which the real motion space RMS is equally projected. The coordinates of the virtual reality correspond to the coordinates of the virtual camera space VCS, and the coordinates of the virtual motion space VMS should be converted to the coordinates of the virtual camera space VCS. The field of view $FOV_{vs}$ of the virtual motion space converted like this is a field of view displayed to the user as a virtual space VS, and the user may feel it the same as the field of view $FOV_{cam}$ of the camera.

A translation matrix operation is performed as much as a seventh factor g in the z-axis direction to match the origin $O_{VMS}$ of the virtual motion space VMS and the origin $O_{VCS}$ of the virtual camera space VCS. Here, the seventh factor g may be determined according to the first factor f1 and the third factor f3, which correspond to the distance between the eyeline of the real player RP and the origin $O_{RMS}$, and the space ratio of the real space RS to the virtual space VS. For example, the seventh factor g may be determined according to the space ratio of the sum of the first factor f1 and the third factor f3 to the virtual space VS.

Through the process as described above, coordinates P of a control object such as a hand motion of a user may be converted to virtual coordinates TAT_P and displayed in the virtual reality. Although the process of converting coordinates of an object of the real space to coordinates of the virtual space is described with reference to FIG. 5 through an expression of converting a specific space, converting a space may be understood as a concept the same as that of converting a coordinate system for expressing the space.

That is, the image analysis unit 10 naturally fuses the real space and the virtual space by performing coordinate conversion between the virtual space and the real space based on at least one of the features according to the image information of the object of the real space, physical features of the virtual reality interface apparatus and the user factors.

According to embodiments, since the distance factor and the user factors are needed to convert coordinates of the object of the real space to coordinate of the virtual space, a process of acquiring or deriving the distance factor and the user factors may be required.

The display unit 40 may display various interface images for the user wearing the virtual reality apparatus (step S400). For example, the display unit 40 may display a guide image for matching the position of the object image in the real space to the virtual space with respect to the eyeline of the user. At this point, the display unit 40 may display the guide image on the virtual reality apparatus during a predetermined time period or may not display the guide image on the virtual reality apparatus if it is assumed that the position of the object image of the real space matches the virtual space according to a predetermined condition.

According to embodiments, the distance factor and the user factors may be derived through the process of performing the interface by the user through the guide image provided by the display unit 40.

When the virtual reality interface apparatus of the present disclosure as described above is used, since a user experiencing virtual reality may see his or her hand motions through the virtual reality apparatus by projecting the hand motions in the virtual space, an effect the same as actually moving in the real space can be obtained. Accordingly, the user may express the hand motions more flexibly and accurately. In addition, when the user desires to move or point an object or the like in the virtual reality based on the position and shape of a hand motion, the interface connecting a real environment and a virtual environment can be improved through such a feedback effect. In addition, according to the present disclosure, the transparency level can be automatically adjusted as the hand motions of the user are getting used to, and since a transparent region may be specified only by setting a region around a moving hand as a region of interest (ROI), indulgence in the virtual reality may not be hindered to the maximum.

Meanwhile, a human visual intelligence system performs feedback control for correcting hand motions that he or she has made by analyzing visual information, such as the shape, the position or the like of the hand, to make correct hand motions. Since the field of view FOV of a camera is narrow compared with the viewing angle of a human being, the working space of a hand motion recognized by the user is different from the working space of a hand motion recognized by the camera. Accordingly, the hand of the user may easily get out of the field of view of the camera due to the limited field of view of the camera. In this case, the user wearing the HMD cannot see and thus is difficult to correct the hand motion. That is, the advantage of the feedback control cannot be obtained while the user wears the HMD. However, in the present disclosure, since information on the real space may be appropriately mixed and shown together with the virtual space through transparency information, the narrow field of view of the camera can be compensated. Accordingly, although the hand of the user disappears from the view of the camera, an action of moving the head or moving the hand into the view of the camera again can be induced, and therefore, the hand may be continuously put in the viewing angle of the camera.

In addition, according to the present disclosure, when the user finishes the experience of the virtual reality, the transparency level can be gradually increased through adjustment by the user or through adjustment by the virtual reality interface apparatus so that the user may safely take off the virtual reality apparatus that he or she is wearing, safely put down a control device such as a controller, or relieve the tension of the visual nerves indulged in the virtual reality, and therefore the user may be guided to safely get out of the virtual reality apparatus.

In addition, according to the present disclosure, an action or the face of a third party located around the user in the real space may be seen through the virtual reality apparatus by recognizing and projecting the action or the face in the virtual space. In this case, when a specific facial expression of the face of the third party in the neighborhood is recognized and reflected in the virtual reality, it can be applied to an augmentation type application that is manufactured by mixing the virtual space and the real space.

The present disclosure may be implemented as a computer-readable code in a computer-readable recording medium. The computer-readable recording medium includes all storage media such as a magnetic storage medium, an optically readable medium, and the like. In addition, data formats of message used in the present disclosure can be recorded in the recording medium.

The present invention has been described in detail focusing on the preferred embodiments shown in the drawings. These embodiments are not to restrict the present invention but only illustrative, and should be considered from the descriptive viewpoint, not restrictive viewpoint. The real technical protection scope should be defined by the technical spirit of the appended claims, not by the descriptions stated above. Although specific terms are used in the specification, they are used only for the purpose of describing the concept of the present invention, not to restrict the meaning or limit the scope of the present invention stated in the claims. Therefore, those skilled in the art may understand that various modified forms and equivalent other embodiments are possible without departing from the fundamental spirit of the present invention. It should be understood that the equivalents include equivalents to be developed in the future, as well as presently known equivalents, i.e., all constitutional components invented to perform the same function regardless of a structure.

The invention claimed is:

1. A virtual reality interface method for providing fusion with a real space, the method comprising:
    analyzing object information of the real space from image information of the real space;
    determining transparency information for an object of the real space according to the object information of the real space; and
    fusing an object image of the real space by projecting the object of the real space in a virtual space based on the transparency information,
    wherein the analyzing the object information of the real space comprises:
    extracting the object of the real space from the image information of the real space; and
    deriving parameter information for determining the transparency information of the extracted object of the real space, and analyzing the object information of the real space,
    wherein the extracting the object of the real space comprises extracting a control object for controlling virtual reality,
    wherein the analyzing the object information of the real space by deriving parameter information comprises deriving a parameter including adaptability information,
    wherein the determining the transparency information for the object of the real space comprises determining a transparency level for projecting the object of the real space in the virtual space based on the parameter information, and
    wherein when the control object is extracted from the image information of the real space, the parameter including the adaptability information of the control object is derived, and the determining the transparency information for the object of the real space comprises adjusting the transparency level according to a degree of adaptability.

2. The method according to claim 1, wherein the determining the transparency level for the object of the real space further comprises recalculating the transparency level according to a variation of the transparency level when the parameter information meets a predetermined condition of changing the transparency level.

3. The method according to claim 1, wherein the determining the transparency information for the object of the real space further comprises determining a transparent region for projecting the object of the real space in the virtual space based on the parameter information.

4. The method according to claim 3, wherein the determining the transparent region for projecting the object of the real space comprises determining a shape and a transparency style of the transparent region and processing a boundary of the transparent region.

5. The method according to claim 1, wherein the fusing object images of the virtual space and the real space based on the transparency information comprises adjusting positions of the object images of the virtual space and the real space with respect to an eyeline of a user wearing a virtual reality apparatus.

6. The method according to claim 5, wherein a guide image for interfacing is displayed above the fused image, and wherein the guide image is not displayed on the virtual reality apparatus when the positions of the object images in the virtual space and the real space match each other according to a predetermined time or a predetermined condition.

7. A virtual reality interface method for providing fusion with a real space, the method comprising:
analyzing object information of the real space from image information of the real space;
determining transparency information for an object of the real space according to the object information of the real space; and
fusing an object image of the real space by projecting the object of the real space in a virtual space based on the transparency information,
wherein the analyzing the object information of the real space comprises:
extracting the object of the real space from the image information of the real space; and
deriving parameter information for determining the transparency information of the extracted object of the real space, and analyzing the object information of the real space,
wherein the extracting the object of the real space comprises extracting a background object of the real space,
wherein the analyzing the object information of the real space by deriving parameter information comprises deriving a parameter including variance information,
wherein the determining the transparency information for the object of the real space comprises determining a transparency level for projecting the object of the real space in the virtual space based on the parameter information, and
wherein when the background object is extracted from the image information of the real space, the parameter including the variance information of the background object is derived, and
the determining the transparency information for the object of the real space comprises adjusting the transparency level by sensing an environmental change in the real space based on the variance.

8. The method according to claim 7, wherein the determining the transparency level for the object of the real space further comprises recalculating the transparency level according to a variation of the transparency level when the parameter information meets a predetermined condition of changing the transparency level.

9. The method according to claim 7, wherein the fusing object images of the virtual space and the real space based on the transparency information comprises adjusting positions of the object images of the virtual space and the real space with respect to an eyeline of a user wearing a virtual reality apparatus.

10. A virtual reality interface method for providing fusion with a real space, the method comprising:
analyzing object information of the real space from image information of the real space;
determining transparency information for an object of the real space according to the object information of the real space; and
fusing an object image of the real space by projecting the object of the real space in a virtual space based on the transparency information,
wherein the analyzing the object information of the real space comprises:
extracting the object of the real space from the image information of the real space; and
deriving parameter information for determining the transparency information of the extracted object of the real space, and analyzing the object information of the real space,
wherein the extracting the object of the real space comprises extracting a specific object of the real space,
wherein the analyzing the object information of the real space by deriving parameter information comprises deriving a parameter including state information,
wherein the determining the transparency information for the object of the real space comprises determining a transparency level for projecting the object of the real space in the virtual space based on the parameter information, and
wherein when the specific object is extracted from the image information of the real space, the parameter including the state information of the specific object is derived, and
the determining the transparency information for the object of the real space comprises adjusting the transparency level based on the state information to have the specific object interact in association with the virtual space.

11. The method according to claim 10, wherein the determining the transparency level for the object of the real space further comprises recalculating the transparency level according to a variation of the transparency level when the parameter information meets a predetermined condition of changing the transparency level.

12. The method according to claim 10, wherein the fusing object images of the virtual space and the real space based on the transparency information comprises adjusting positions of the object images of the virtual space and the real space with respect to an eyeline of a user wearing a virtual reality apparatus.

13. A virtual reality interface method for providing fusion with a real space, the method comprising:
analyzing object information of the real space from image information of the real space;
determining transparency information for an object of the real space according to the object information of the real space; and
fusing an object image of the real space by projecting the object of the real space in a virtual space based on the transparency information,
wherein the analyzing the object information of the real space comprises:
extracting the object of the real space from the image information of the real space; and
deriving parameter information for determining the transparency information of the extracted object of the real space, and analyzing the object information of the real space,
wherein the extracting the object of the real space comprises extracting at least one of a control object for controlling virtual reality, a background object of the real space, and a specific object of the real space,
wherein the analyzing the object information of the real space by deriving parameter information comprises deriving at least one parameter of a parameter including adaptability information, a parameter including variance information, and a parameter including state information, and
wherein the determining the transparency information for the object of the real space comprises:
determining a transparent region for projecting the object of the real space in the virtual space based on the parameter information; and determining whether or not to reflect the transparent region as an entire region or a partial region of the virtual space based on at least one of the adaptability information, the variance information, and the state information included in the parameter information.

14. The method according to claim 13, wherein the determining the transparent region for projecting the object of the real space comprises determining a shape and a transparency style of the transparent region and processing a boundary of the transparent region.

15. A virtual reality interface apparatus for providing fusion with a real space, the apparatus comprising:
an image analysis unit for analyzing an object information of the real space to be projected in a virtual space based on image information of the real space acquired from a camera;
a transparency information determination unit for determining transparency information for an object of the real space according to the object information of the real space; and
a transparency information reflection unit for fusing object images of the virtual space and the real space based on the transparency information,
wherein the image analysis unit extracts the object of the real space from the image information of the real space, derives parameter information for determining the transparency information of the extracted object of the real space, and analyzes the object information of the real space,
wherein the image analysis unit extracts at least one of a control object for controlling virtual reality, a background object of the real space, and a specific object of the real space, and derives at least one parameter of a parameter including adaptability information, a parameter including variance information, and a parameter including state information,
wherein the transparency information determination unit determines a transparency level corresponding to a degree of transparency of the object of the real space to be projected in the virtual space based on the parameter information, and
wherein when the image analysis unit extracts the control object from the image information of the real space, the parameter including the adaptability information of the control object is derived, and the transparency information determination unit adjusts the transparency level according to a degree of adaptability.

16. The apparatus according to claim 15, wherein the transparency information determination unit recalculates the transparency level according to a variation of the transparency level when the parameter information meets a predetermined condition of changing the transparency level.

17. The apparatus according to claim 15, wherein the transparency information determination unit determines a transparent region for projecting the object of the real space in the virtual space based on the parameter information.

18. The apparatus according to claim 17, wherein the transparency information determination unit determines a shape and a transparency style of the transparent region and processes a boundary of the transparent region.

19. The apparatus according to claim 15, wherein when the image analysis unit extracts the background object from the image information of the real space, the parameter including the variance information of the background object is derived, and the transparency information determination unit adjusts the transparency level by sensing an environment change in the real space based on the variance.

20. The apparatus according to claim 15, wherein when the image analysis unit extracts the specific object from the image information of the real space, the parameter including the state information of the specific object is derived, and the transparency information determination unit adjusts the transparency level based on the state information to have the specific object interact in association with the virtual space.

* * * * *